US012055926B2

(12) United States Patent
Gourvenec et al.

(10) Patent No.: US 12,055,926 B2
(45) Date of Patent: Aug. 6, 2024

(54) METHOD FOR PREDICTING CLOGGING OF DISTILLATION COLUMN(S) IN A REFINERY, COMPUTER PROGRAM AND ASSOCIATED PREDICTION SYSTEM

(71) Applicant: TotalEnergies OneTech, Courbevoie (FR)

(72) Inventors: Sébastien Gourvenec, Saint Samson de la Roque (FR); Régis Cahors, Saint Aubin Routot (FR)

(73) Assignee: TotalEnergies One Tech, Courbevoie (FR)

( * ) Notice: Subject to any disclaimer, the term of this patent is extended or adjusted under 35 U.S.C. 154(b) by 0 days.

(21) Appl. No.: 17/910,869

(22) PCT Filed: Mar. 17, 2021

(86) PCT No.: PCT/EP2021/056787
§ 371 (c)(1),
(2) Date: Sep. 12, 2022

(87) PCT Pub. No.: WO2021/185889
PCT Pub. Date: Sep. 23, 2021

(65) Prior Publication Data
US 2023/0119842 A1   Apr. 20, 2023

(30) Foreign Application Priority Data
Mar. 18, 2020   (FR) ........................................ 2002636

(51) Int. Cl.
*G05B 23/02*   (2006.01)
*B01D 3/42*    (2006.01)
*G05B 13/04*   (2006.01)

(52) U.S. Cl.
CPC ........ *G05B 23/0283* (2013.01); *B01D 3/4211* (2013.01); *G05B 13/048* (2013.01); *G05B 23/024* (2013.01)

(58) Field of Classification Search
CPC .. B01D 3/4211; G05B 13/048; G05B 23/024; G05B 23/0283
See application file for complete search history.

(56) References Cited

U.S. PATENT DOCUMENTS 11,531,328 B2 * 12/2022 Weichenberger .... B01D 3/4211
2002/0116079 A1    8/2002 Kern et al.
(Continued)

FOREIGN PATENT DOCUMENTS

WO   WO-2021185889 A1 *  9/2021 ........... B01D 3/4211
WO   WO-2023275371 A1 *  1/2023 ............. G05B 23/02

OTHER PUBLICATIONS

Yusof, K. M., et al. "Development of Neural Network Models for a Crude Oil Distillation Column" Journal Teknologi 38(F):53-64 (2003) cited as 2012 in FR SR & ISR submitted herewith; cited in Specification as 2012.
(Continued)

*Primary Examiner* — Mischita L Henson
(74) *Attorney, Agent, or Firm* — TROUTMAN PEPPER HAMILTON SANDERS LLP

(57) ABSTRACT

The invention relates to a method for predicting flooding in a distillation column by machine learning including a constructing and training phase of a machine learning model obtained from previously collected data and from a set of sensors, an operational phase for predicting flooding(s), by collecting a current data flow until a buffer is filled, pre-processing data from the data buffer by predetermined cleansing and classification, synchronizing the data of the current set of clean and classified data, determining a value of a current variable representative of at least one current (Continued)

performance of the at least one distillation column, forming a current set of transformed data by calculating predetermined derivatives, and predicting the current state of said distillation column by applying said learning model to said current set of transformed data.

11 Claims, 2 Drawing Sheets

(56) References Cited

U.S. PATENT DOCUMENTS

2008/0082295 A1   4/2008  Kant et al.
2018/0275690 A1   9/2018  Lattanzio et al.

OTHER PUBLICATIONS

Rapport de Recherche Préliminaire issued in French Patent Application No. 2002636 dated Dec. 2, 2020.
Rapport de Recherche Internationale issued in International Patent Application No. PCT/EP2021/056787 dated Jun. 10, 2021.

* cited by examiner

METHOD FOR PREDICTING CLOGGING OF DISTILLATION COLUMN(S) IN A REFINERY, COMPUTER PROGRAM AND ASSOCIATED PREDICTION SYSTEM

CROSS REFERENCE TO RELATED APPLICATIONS

The present application is a U.S. National Phase Application under 35 U.S.C. § 371 of International Patent Application No. PCT/EP2021/056787 filed Mar. 17, 2021, which claims priority of French Patent Application No. 20 02636 filed Mar. 18, 2020. The entire contents of which are hereby incorporated by reference.

FIELD

The present invention relates to a method for predicting flooding in at least one distillation column of a refinery.

The present invention further relates to a computer program comprising software instructions which, when executed by a computer, implement such a prediction method.

The present invention further relates to a system for predicting flooding in at least one distillation column of a refinery, which is implemented by machine learning.

BACKGROUND

Document U.S. Pat. No. 2018/275690 A1 and document U.S. Pat. No. 2002/116079 A1 both relate to the monitoring of the general operation of a refinery; document U.S. Pat. No. 2018/275690 A1 discloses in particular, that the performance of the refinery, or of a refinery unit are compared to the performance predicted by one or more process models in order to identify differences or deficiencies in operation.

U.S. Pat. No. 2008/082295 A1 relates to a system and a method for facilitating the monitoring and the diagnosis, aimed at preventing any abnormal situation in a coking heating apparatus of a coking unit in a product refining process.

However, none of these documents discloses a solution specifically dedicated to monitoring the state of a refinery distillation column(s) and in particular to predicting flooding in one or more distillation columns.

The work of Khairiyah et al. in the article entitled: "*Development of neural Networks Models for a Crude Oil Distillation Column*" Jurnal Teknologi, Jan. 20, 2012 discusses the development of an artificial neural network model for optimizing the operation of a distillation column but does not disclose nor suggest a specific solution for predicting flooding.

The present invention relates specifically to monitoring the state of distillation column(s) in a refinery and in particular to predicting flooding in the columns.

Distillation is a process used to separate or purify different liquid substances from a mixture. Distillation column flooding occur when the vapor flow-rate within the column exceeds a predetermined flow-rate threshold and as a result the liquid can no longer flow through the column. Such flooding is frequent, occurring on average eight to nine times per month e.g. for an atmospheric distillation column, is due to various causes such as excessive vapor flow-rate and/or heating, etc.

Conventionally, such flooding events are unfortunately detected after their occurrence, through an increase in the differential pressure greater than a predetermined threshold and a decrease in the production performance, and a decrease in the quality of separation. After flooding, the stabilization of a distillation column is slow, e.g. on the order of eight hours for an atmospheric distillation column, and penalizing in terms of profitability.

To remedy this, it is necessary to predict such flooding in order to anticipate and, if possible, to prevent the flooding. E.g., in order to prevent flooding in an atmospheric distillation column, it is necessary to predict the occurrence of such an event at least twenty minutes in advance.

Predictors have so far been developed using conventional methods based on theoretical equations such as the equations developed from the work of H. Z. Kister et al. in the article entitled "*Predict Entrainment Flooding on Sieve and valve trays*" chemical engineering progress. 1990, Vol 86, Num 9, PP 63-69 for a first capacity predictor, and/or on temperature and differential pressure analyzes for a second predictor. However, such first and second predictors are currently not very efficient: the number of erroneous predictions (i.e. false positives predicting a flooding while the operation remains nominal) or of absence of prediction (i.e. false negatives, a flooding occurs and has not been predicted beforehand) remains too significant, and moreover, an erroneous prediction triggers a costly, useless slowdown in the rate of production in order to avoid a flooding unlikely to occur, whereas the occurrence of an undetected flooding slows down, or even simply stops the operation of the column during the time to re-stabilize same, which is also costly.

SUMMARY

The aim of the invention is to propose a method and a prediction system which makes it possible, in comparison with current predictors, to reduce the prediction errors corresponding to the sum of the erroneous predictions (i.e. false positives) and the absence of prediction (i.e. false negatives), and to better identify operating parameter(s) or characteristic(s) likely to trigger flooding.

To this end, the subject matter of the invention relates to a prediction method of the aforementioned type, namely a method for predicting flooding in at least one distillation column of a refinery, which is implemented by machine learning, the method comprising:
- a constructing and training phase a machine learning model for predicting flooding, obtained from a set of data collected beforehand, during a predetermined prior period, and at least from a set of sensors of the refinery, each collected datum being associated with a sensor time datum,
- an operational phase of predicting flooding comprising the following steps:
    - from said set of sensors of the refinery, collecting a current data flow until a data buffer of predetermined size is filled, each datum of the current data flow being further associated with a sensor time datum,
    - pre-processing the data from the data buffer by predetermined cleansing and classification delivering a current set of clean and classified data,
    - synchronizing the sensor time data associated with the data of the current collected data flow of the current set of clean and classified data, delivering a current set of clean, classified and synchronized data,
    - from the current set of clean, classified and synchronized data, determining at least one value of a current variable representative of at least one current performance of said at least one distillation column, and adding said at least one value of the variable to the current set of clean, classified and synchronized data so as to form a current set of data to be processed, forming a current set of transformed data by calculating predetermined derivatives of the current set of data to be processed, predicting the current state of said at least one distillation column by applying said learning model to said current set of transformed data, said current state corresponding to a binary value representative of either the presence or the absence of a current pre-flooding.

The prediction method according to the present invention is then suitable for efficiently improving in real-time, the prediction of flooding in a distillation column, based no longer on a single predictor but on a multi-criteria approach processed by machine learning via of a sequence of steps executed according to an order specific to the present invention in order to construct in real-time, a relevant data set for processing by a learning model, the learning model being built beforehand and trained from a previously collected data set.

In particular, the data synchronization step followed by the step of determining and adding at least one value of a current variable representative of at least one current performance of said at least one column, are used, in synergy and according to this specific sequence of steps, to enrich the set of data collected in real-time and to refine the flooding prediction implemented by the learning model.

The position of the synchronization step in the specific sequence of steps according to the present invention is particularly crucial because it makes it possible to eliminate any delay between a cause and the effect thereof while following the dynamics of the distillation process implemented within the column considered. Without such positioning of the synchronization step within the specific sequence of steps according to the present invention, the data representative of the cause are not correctly related to consequences thereof and the resulting calculated characteristics are not significant and relevant.

Indeed, according to an evaluation by the inventors, such a method of predicting flooding in at least one distillation column of a refinery makes it possible, in comparison with the first and second current predictors mentioned above, to obtain a detection efficiency performance improved by 10 to 50%. Thus, the present invention makes it possible to better diagnose, in advance and specifically, a risk of flooding in at least one distillation column of a refinery, which is not the purpose of the aforementioned documents U.S. Pat. No. 2018/275690 A1, U.S. Pat. No. 2002/116079 A1, U.S. Pat. No. 2008/082295 A1 and of the work of Khairiyah et al. in the article entitled: "Development of Neural Networks Models for a Crude Oil Distillation Column" Jurnal Teknologi Jan. 20, 2012, none of these documents explicitly disclosing the prediction of flooding in a distillation column, nor the specific order and all the steps of the process of predicting flooding in at least one distillation column of a refinery according to the present invention.

According to other advantageous aspects of the invention, the prediction method comprises one or more of the following features, taken individually or according to all technically possible combinations:

the constructing and training phase a flooding prediction machine learning model comprise the following steps:
pre-processing of the set of data previously collected by pre-determined cleansing and classification which delivers a pre-set of clean and classified data, synchronizing the sensor time data associated with the collected data of the preliminary set of clean and classified data, delivering a preliminary set of clean, classified and synchronized data, from the preliminary set of clean, classified and synchronized data, determining at least one value of a variable representative of at least one previous performance of the at least one distillation column, and adding the at least one value of the variable to the preliminary set of clean, classified and synchronized data so as to form a preliminary set of data to be processed, performing regression on said learning model, by calculating and filtering predetermined derivatives of the preliminary set of data to be processed, forming two classes resulting from said learning model associated with normal operation of said at least one distillation column and with a pre-flooding of said at least one distillation column, respectively, re-sampling said two classes resulting from said learning model at a predetermined sampling rate, determining, training and validating said learning model using all the samples coming from the re-sampling step;

the synchronization implemented within the constructing and training phase a machine learning model of flooding prediction and/or implemented within the operational phase of flooding prediction comprises the application of time lag(s) determined as a function of the position of each sensor of said set of sensors;

the learning model is a random forest model comprising a predetermined number of estimators, and a maximum depth configured to extend each node of the random forest until all leaves are pure or until all leaves contain less than two samples;

the current variable representative of at least one current performance and/or the variable representative of at least one prior performance are of a type belonging to the group comprising at least:

a variation in the gross flow-rate within the at least one distillation column, a flooding characteristic corresponding to the difference between a predetermined reflux flow-rate setpoint and a reflux flow-rate measured and collected during a data collection step associated with the operational phase or the construction phase, an upper recirculation indicator of the at least one distillation column corresponding to the ratio of the liquid-vapor ratio to the reflux ratio of the draw tray, the liquid-vapor ratio and the reflux ratio being measured and collected during a data collection step associated with the operational phase or with the construction phase, a risk indicator determined at least from temperature and pressure data of the at least one distillation column measured and collected during a data collection step associated with the operational phase or the construction phase, a flooding indicator obtained from predetermined theoretical equations and an associated binary indicator, a set of predetermined temperature deviations and ratios obtained from at least two sensors of said set of sensors located at distinct positions with respect to the position of said at least one distillation column, a material balance, an enthalpy;

the prediction step associates a probability with the binary value and wherein the method further comprises, after predicting the current state of said at least one distillation column, a step of generating and returning an alert to at least one operator located within the refinery, in the event of obtaining a binary value representative of the presence of a current pre-flooding with an associated probability value greater than a predetermined probability threshold, during the prediction step;

the prediction method further comprises a step of storing the data of the current data flow within the previously collected data set for a subsequent iteration of the constructing and training phase the flooding prediction machine learning model, updating said machine learning model for a subsequent iteration of said prediction operational phase;

the prediction method comprises a compression step implemented during the collection of a current data flow with a predetermined compression ratio and a step of verifying that said compression ratio is maintained at each subsequent collection step.

The invention further relates to a computer program including software instructions which, when executed by a computer, implement a method for monitoring the execution of an application on an electronic computer, as defined above.

The invention further relates to a prediction system for at least one distillation column of a refinery implemented by machine learning, the system comprising at least one database, further comprising:

a unit for the preliminary construction and training of a machine learning model for predicting flooding obtained from a previously collected data set stored within said database, during a predetermined prior period, and at least from a set of sensors of the refinery, each collected datum being associated with a sensor time datum, a unit for predicting flooding comprising:
  a data buffer of predetermined size and a collection module configured to collect, from said set of sensors of the refinery, a current data flow until said data buffer of predetermined size is filled, each datum in the current data flow being further associated with a sensor time datum,
  a pre-processing module configured to pre-process the data from the data buffer by predetermined cleansing and classification delivering a current set of clean and classified data,
  a synchronization module configured to synchronize the sensor time data associated with the data of the current collected data flow of the current set of clean and classified data, delivering a current set of clean, classified and synchronized data,
  a determination module configured for determining, from the current set of clean, classified and synchronized data, at least one current value of a variable representative of at least one current performance of said at least one distillation column, and for adding the at least one value of the variable to the current set of clean, classified and synchronized data so as to form a current set of data to be processed,
  a formation module configured for forming a current set of transformed data by calculating predetermined derivatives of the current set of data to be processed,
  a prediction module configured for predicting the current state of said at least one distillation column by applying said training model to said current set of transformed data, said current state corresponding to a binary value representative of either the presence or the absence of a current pre-flooding.

According to another advantageous aspect of the invention, the prediction system is such that
  the collection module is located within the refinery itself, and
  the unit for the preliminary construction and training of a flooding prediction machine learning model, the data buffer, the preprocessing module, the synchronization module, the determination module, the formation module and the prediction module of the flooding prediction unit, are external to the refinery and organized as cloud computing,
  the collection module being further apt to directly load the data buffer, the prediction system further comprising a reception module apt to receive information representative of the prediction of the current state of said at least one distillation column and returnable to at least one operator present within the refinery, via a returning means of said prediction system.

BRIEF DESCRIPTION OF THE DRAWINGS

The features and advantages of the invention will appear more clearly upon reading the following description, given only as a non-limiting example, and making reference to the enclosed drawings, wherein.

DETAILED DESCRIPTION

Figure 1:
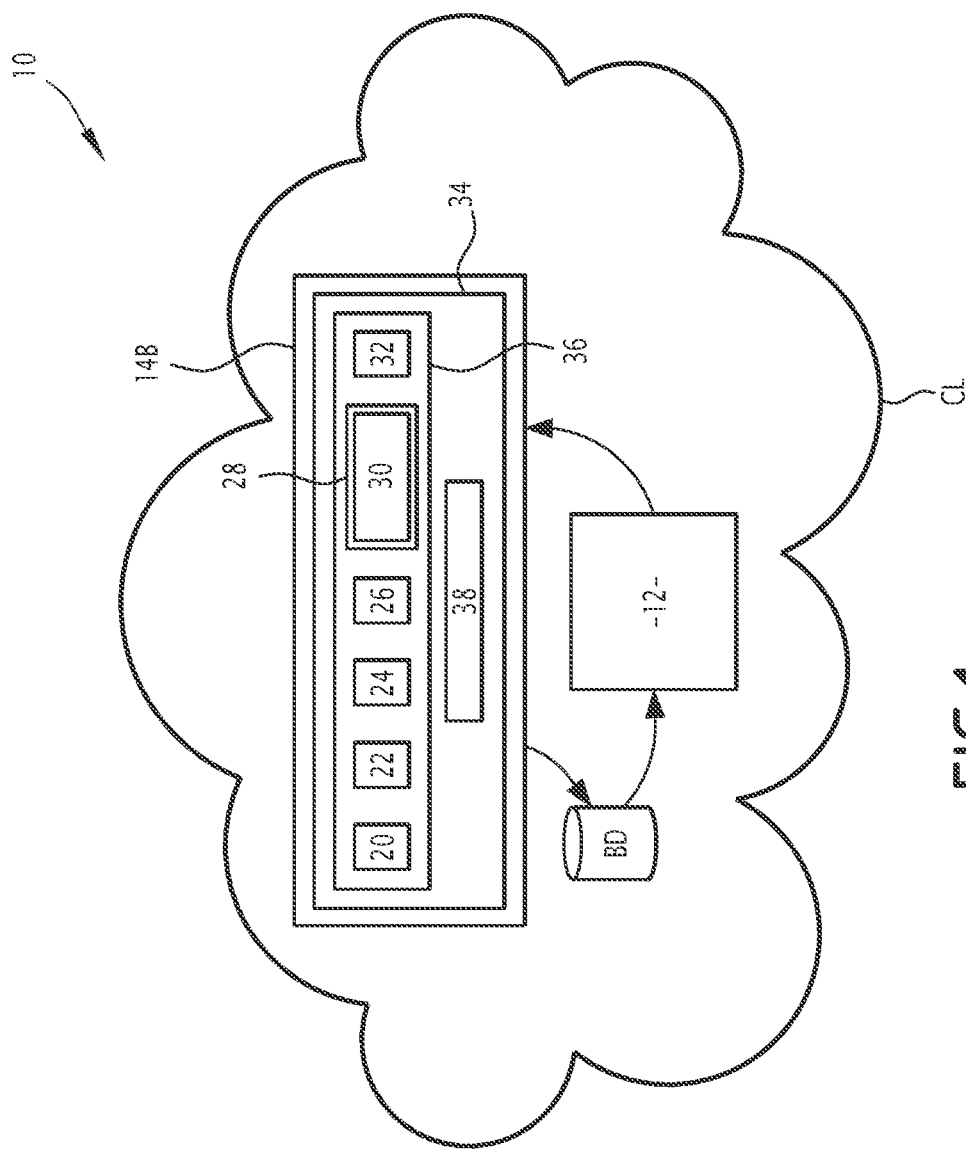
FIG. 1 is a schematic view of the material elements of the prediction system according to the present invention.

FIG. 1 shows an example of an architecture of a prediction system 10 according to the present invention. According to such architecture, the prediction system 10 according to the invention is distributed over two distinct parts, namely within a refinery R itself and remotely, e.g., within a cloud computing CL system.

More precisely, the system for predicting flooding 10 in at least one distillation column of a refinery R implemented by machine learning, comprises at least one database BD or a set BD of databases organized in cloud computing, a unit 12 for the preliminary construction and training of a machine learning model for predicting flooding, which is obtained from a previously collected data set stored in the database BD, and a unit 14 for predicting flooding.

It should be noted that the unit 12 for the preliminary construction and training of a machine learning model for predicting flooding is most often remote from the refinery, e.g., in a manner not shown, integrated into the personal computer of a refinery operator, the operator being, where appropriate, mobile and able to move inside and outside the refinery, and such a unit 12 is not necessarily integrated directly into cloud computing but, e.g., only able to communicate with same.

As illustrated by FIG. 1, the flooding prediction unit 14 consists of two parts, a part $14_A$ within the refinery R itself and a part $14_B$ distributed over a set of servers organized in cloud computing CL.

More precisely, the database BD has been built beforehand by storing a set of data previously collected and obtained by means of a set of sensors $C_1$ to $C_N$ distributed within the refinery R (where N is an integer greater than or equal to one), in particular on the order of one thousand sensors per distillation column of the refinery R with e.g. a temperature sensor in contact with the walls of a distillation column considered, a pressure sensor in contact with the fluids flowing through the pipes of the same column considered. E.g. the sensors $C_1$ to $C_N$ measure a plurality of types of data within the distillation column considered, namely temperatures, pressures, flow-rates, valve openings, etc. Such data have been archived for many years within the database.

According to a particular aspect, the unit 12 for the preliminary construction and training of a machine learning model for predicting flooding is suitable for extracting from the database, a set of data previously collected during a predetermined prior period and sampled at a predetermined sampling rate, e.g. of one minute (i.e. each datum of the same data type being associated with a sensor time datum, spaced out from the previous datum and the next datum by one minute).

The detailed operation of such a construction and training unit 12 will be described thereafter with reference to FIG. 2.

The flooding prediction unit composed of the two parts $14_A$ and $14_B$ comprises more precisely, in the part $14_A$ located within the refinery R itself, a collection module 16 configured for collecting, from the refinery set of sensors $C_1$ to $C_N$, a current data flow until a data buffer (not shown) of predetermined size is filled, each data in the current data flow being further associated with a sensor time datum.

According to a first variant, the data buffer is filled within the refinery R itself and then, once same is filled, is sent via a transceiver module 18 of the refinery R to a receiver module (not shown) of the set of servers organized in cloud computing CL.

As an alternative, the buffer is located directly on one of the servers organized in cloud computing CL, and the collection module 16 is configured for filling same in real-time via the transceiver module 18 of the refinery R.

According to a particular aspect, the transceiver module 18 of the refinery R is solely dedicated to the prediction system 10 according to the present invention. In such a case, the prediction system 10 according to the present invention comprises such a dedicated transceiver module 18, and according to a variant (not shown) such a transceiver module 18 is further directly integrated within the part $14_A$ of the flooding prediction unit.

According to a particular aspect, such a collection module is further apt to feed the database BD beforehand.

The flooding prediction unit further comprises, in the part $14_B$ located within the cloud computing CL, a preprocessing module 20 configured for preprocessing the data of the data buffer by predetermined cleansing and classification, which delivers a current set of clean and classified data. In other words, the preprocessing module 20 has an input connected to the data buffer.

The flooding prediction unit further comprises, in the part $14_B$ located within the cloud computing CL, a synchronization module 22 configured for synchronizing the sensor time data associated with the data of the current collected data flow of the current set of clean and classified data, which delivers a common set of clean, classified and synchronized data. In other words, the synchronization module 22 has an input connected to the output of the preprocessing module 20.

The flooding prediction unit further comprises, in the part $14_B$ located within the cloud computing CL, a determination module 24 configured for determining, from the current set of clean, classified and synchronized data, at least one current value of a variable representative of at least one current performance of said at least one distillation column, and for adding said at least one value of the variable to the current set of clean, classified and synchronized data so as to form a current set of data to be processed. In other words, the determination module 24 has an input connected to the output of the synchronization module 22.

The flooding prediction unit also comprises, in the part $14_B$ located within the cloud computing CL, a formation module 26 configured for forming a current set of transformed data by calculating predetermined derivatives of the current set of data to be processed. In other words, the formation module 26 has an input connected to the output of the determination module 24.

The flooding prediction unit also comprises, in the part $14_B$ located within the cloud computing CL, a prediction module 28 configured for predicting the current state of the at least one distillation column by applying the learning model to the current set of transformed data, the current state corresponding to a binary value representative of either the presence or the absence of a current pre-flooding. In other words, the prediction module 28 has an input connected to the output of the formation module 26.

As an optional addition, the prediction module 28 comprises a calculation tool 30 configured for calculating a probability (i.e. a confidence index) of flooding and to compare same with a predetermined probability threshold so as to obtain the binary value representative of either the presence or the absence of a current pre-flooding, and a module 32 for generating an alert in the event of obtaining a binary value representative of the presence of a current pre-flooding with an associated probability value greater than a predetermined probability threshold, during the prediction step.

According to another optional particular aspect, the prediction system 10 further comprises a reception module, e.g. the transceiver module 18 illustrated in FIG. 1, suitable for receiving information representative of the prediction of the current state of said at least one distillation column and apt to be returned to at least one operator present within the refinery, via a returning means E of the prediction system 10.

In particular, such representative information corresponds e.g. directly to an alert generated by the optional alert generation module 32.

According to a particular aspect, the part $14_B$ located within the cloud computing CL is further configured for storing the data of the current data flow within the previously collected data set of the database BD for a subsequent iteration of the constructing and training phase the machine learning model for predicting flooding, as implemented by the construction and training unit 12, updating said machine learning model for a subsequent iteration of said operational prediction phase.

In the example shown in FIG. 1, the part $14_B$ located within the cloud computing CL of the flooding prediction unit comprises one or more information processing units 34, formed e.g. by a memory 36 associated with a processor 38 such as a CPU (Central Processing Unit).

In the example shown in FIG. 1, the preprocessing module 20, the synchronization module 22, the determination module 24, the formation module 26, the prediction module 28 and optionally the calculation module 30 and the generation module 32 are each implemented in the form of software executable by the processor 38.

The memory 36 of the information processing unit 34 is then apt to store preprocessing software configured for preprocessing the data of the data buffer (transmitted by the transceiver module 18 of the refinery R, or according to a variant (not shown), the buffer directly stored within the memory 36) by predetermined cleansing and classification delivering a current set of clean and classified data. The memory 36 of the information processing unit 34 is further apt to store synchronization software configured for synchronizing the sensor time data associated with the data of the current collected data flow of the current set of clean and classified data, which delivers a current set of clean, classified and synchronized data, a determination software configured for determining, from the current set of clean, classified and synchronized data, at least one current value of a variable representative of at least one current performance of the at least one distillation column, and for adding the at least one value of the variable to the current set of clean, classified and synchronized data so as to form a current set of data to be processed, a formation software configured for forming a current set of transformed data by calculating predetermined derivatives of the current set of data to be processed, a prediction software configured for predicting the current state of said at least one distillation column by applying said learning model to said current set of transformed data, said current state corresponding to a binary value representative of either the presence or the absence of a current pre-flooding. Optionally, the memory 36 of the information processing unit further comprises a software for calculating a probability (i.e. a confidence index) associated with the binary value representative of either the presence or the absence of a current pre-flooding and a software for generating an alert in the event of obtaining a binary value representative of the presence of a current pre-flooding with an associated probability value greater than a threshold of predetermined probability, during the prediction step.

The processor 38 is then apt to run, in series, the preprocessing software, the synchronization software, the determination software, the formation software, the prediction software and optionally the calculation software and the alert generation software.

In a variant (not shown), the preprocessing module 20, the synchronization module 22, the determination module 24, the formation module 26, the prediction module 28 and optionally the calculation module 30 and the generation module 32 are each implemented in the form of a programmable logic component, such as an FPGA (Field Programmable Gate Array), or in the form of a dedicated integrated circuit, such as an ASIC (Application Specific Integrated Circuit).

When at least part of the prediction system 10 is implemented in the form of one or more software programs, i.e. in the form of a computer program, same is further apt to be recorded on a computer-readable medium (not shown). The computer-readable medium is e.g. a medium apt to store electronic instructions and to be coupled to a bus of a computer system. As an example, the readable medium is an optical disk, a magneto-optical disk, a ROM memory, a RAM memory, any type of non-volatile memory (e.g. EPROM, EEPROM, FLASH, NVRAM), a magnetic card or an optical card. A computer program comprising software instructions is then stored on the readable medium.

The operation of the prediction system 10 will now be explained with the help of FIG. 2 which shows a flowchart of a process 38 for predicting flooding in at least one distillation column of a refinery, as implemented by machine learning.

Such a method 38 comprises two distinct phases 40 and 42, namely, a phase A of constructing and training of a machine learning model M for predicting flooding, as obtained from a set of data collected beforehand, during a predetermined prior period, and at least from a set of sensors of the refinery, each collected datum being associated with a sensor time datum implemented by the unit 12 for the preliminary construction and training of a machine learning model for predicting flooding, and an operational phase B of predicting flooding, as implemented in real-time by the flooding prediction unit 14.

The constructing and training phase 40 of a machine learning model M is necessarily implemented before the flooding prediction phase B as such because phase A feeds the learning model M into the flooding phase implemented in real-time.

More precisely, the constructing and training phase 40 a machine learning model M for predicting flooding comprises a sequence of steps according to an order specific to the present invention and comprises a first step 44 of preprocessing PREP-P-P of the set of data collected beforehand, and in particular stored within the database BD by predetermined cleansing and classification delivering a preliminary set of clean and classified data.

In particular, such a pretreatment consists in particular of:
converting the format in which the data was previously collected, e.g. from an Excel tabular format into a data frame according to a format suitable for the Python language using the pandas library, then
in this converted form, filtering the collected values by identifying and then deleting outliers because same are double or redundant or even constant and therefore irrelevant for determining a flooding, which reduces the number of data to be processed by 30 to 40%, then
cleaning and classifying the data coming from filtering by successively implementing the following sub-steps:
first replacement of character strings by the term NaN (not a number) when numerical values are expected by the learning model, then
classifying data coming from the first replacement into five classes, namely:
a class of data associated with a non-operating state,
a class of data associated with a pre-flooding state grouping all data collected during, e.g. 60 minutes preceding a flooding as such,
a class of data associated with a post-flooding state grouping all data collected during e.g. the eight hours following a flooding as such,
a class of data associated with a flooding state grouping all the data collected during the flooding as such,
a class comprising all the remaining data which do not belong to any of the four preceding classes and which are therefore representative of a normal operation of the column,
in each of the five classes, a second replacement of the NaN terms by means of a forward-filling wherein the missing numerical value NaN is filled from the corresponding value in the previous line, and
resetting the columns containing only zero values,
memorizing said cleaned and classified data frames using a suitable storage format which reduces the size of the collected data, e.g. by using Python's Pickle tool which is suitable for implementing binary protocols for serializing and de-serializing a Python object structure.

More precisely, the flooding state as such is detected e.g. in the presence of a collected datum indicating that the distillation column considered is in working order (not shut-down) and based on the measured value of the controlled flow-rate level of the three-phase separator of the column condenser. The flooding state is e.g. detected in the presence of a triplet of conditions, namely that:

the distillation column considered is in working order (i.e. in effective operation), and that the difference between the measured value collected from the flow-rate level and the setpoint value of the flow-rate level is greater than ten, and that the output value of a flow-rate level controller of the column considered is greater than seventy.

When the three conditions are met, flooding is detected and the sensor time datum associated with the measured value of the flow-rate level is used for the classification:

grouping all the collected data associated with the same sensor time datum, in the class of data associated with a flooding state, grouping together all the collected data associated with a sensor time datum which precedes e.g. by a maximum of 60 minutes, the sensor time datum associated with the measured value of the flow-rate level, in the class of data associated with a pre-flooding state, grouping together all the collected data associated with a sensor time datum following e.g. by at most eight hours, the sensor time datum associated with the measured value of the flow-rate level, in the class of data associated with a post-flooding state.

According to a particular practical aspect, the classification consists in assigning a value representative of one of the five classes mentioned above, namely class "out of operation (i.e. shut-down)", "pre-flooding", "flooding", "post-flooding", "not relevant", to the variable representative of the class, e.g. called FI, of each datum collected.

The constructing and training phase 40 a machine learning model M for predicting flooding comprises a second synchronization step SYNC 46 of the sensor time data associated with the collected data of the preliminary set of clean and classified data, which delivers a preliminary set of clean, classified and synchronized data.

In particular, the synchronization 46 implemented within the constructing and training phase 40 of the machine learning model M for predicting flooding comprises the application 47 of time lag(s) TL determined as a function of the position of each sensor of said set of sensors $C_1$ to $C_N$.

More precisely, such time lags correspond to delays in the response of the distillation process to changing conditions, such as e.g. a delay due to a change in the state of the raw material at a particular place in the distillation column. E.g. the time lag to be applied to the data collected by the sensor $C_1$ depends on the distance between the sensor $C_1$ and the position of the flooding point in the distillation column, said position being known and constant for a given distillation column and application. Such time lag(s) are automatically determined from the knowledge of the distillation process implemented within the distillation column considered, and confirmed by a mutual information approach based on the work of O. Ludwig et al. in the article entitled "Applications of information theory, genetic algorithms, and neural models to predict oil flow" CNSNS 14 (2009) 2870-2885.

Such synchronization 46 consists in particular, in recovering the automatically determined time lag values TL and then in applying 47 same to the sensor time data associated with the collected data.

From the previous set of clean, classified and synchronized data, the constructing and training phase 40 of a flooding prediction machine learning model M comprises a third step 48 for determining DET-EF-P at least one value of a variable representative of at least one preliminary performance of said at least one distillation column, and adding the at least one value of the variable to the preliminary set of clean, classified and synchronized data so as to form a preliminary set of data to be processed.

More precisely, the variable representative of at least one prior performance is of a type belonging to the group comprising at least:

a variation in the gross flow-rate within the at least one distillation column, a flooding characteristic corresponding to the difference between the measured value collected during a data collection step associated with the operational phase or the construction phase, of the flow level and the setpoint value of the controlled flow level of the condenser column, three-phase separator, an upper recirculation indicator of the at least one distillation column corresponding to the ratio of the liquid-vapor ratio to the reflux ratio of the draw tray, the liquid-vapor ratio and the reflux ratio being measured and collected during a data collection step associated with the operational phase or with the construction phase, a risk indicator determined at least from temperature and pressure data of the at least one distillation column measured and collected during a data collection step associated with the operational phase or the construction phase, a flooding indicator obtained from predetermined theoretical equations, such as the first capacity predictor mentioned above and an associated binary indicator, a set of predetermined temperature differences and ratios obtained from at least two sensors of said set of sensors located at distinct positions with respect to the position of said at least one distillation column, a material balance, an enthalpy.

In other words, such variable representative of at least one previous performance or preferentially all the variables mentioned above are calculated using predetermined custom engineering equations, specific to each type of distillation column, and relevant in the industrial field of the determination of flooding in refinery distillation columns, for each sensor time datum, and from the data collected at the time instant associated with the sensor time datum considered. Thus, each class of the preliminary set of clean, classified and synchronized data is enriched by the variables representative of performance in order to facilitate the modeling of a flooding.

It should be noted that according to the present invention, such an enrichment step is specifically implemented after synchronization, which makes it possible to use in each engineering equation for obtaining one of the aforementioned variables, the data collected which have the same sensor time datum after synchronization and to avoid a bias when calculating the enrichment variables representative of at least one prior performance of the distillation column.

The constructing and training phase 40 a machine learning model M for predicting flooding further comprises a fourth regression step REG 50 of the learning model M, by calculating and filtering predetermined derivatives of the preliminary set of data to be processed, forming two classes resulting from said learning model, associated with a normal operation of said at least one distillation column and with a pre-flooding of said at least one distillation column, respectively.

More precisely, such calculation and filtering of predetermined derivatives of the set, according to the present invention, of preliminary data to be processed, consists in determining a gradient calculated using precise central differences of the second order applied to an internal subset of said preliminary set of data to be processed (in other words, applied to predetermined inner points of said set), and precise first- or second-order unilateral differences (backward or forward) for the data of said preliminary set of data to be processed, located outside the inner subset, so that the resulting gradient has a shape similar to that of the preliminary data set to be processed and used as input. It should be noted that such a calculation is not applied to the binary indicator associated with the first capacity predictor or to the variable representative of the class, e.g. called FI.

In other words, according to the step 50, the five classes obtained and enriched up to the previous step 48, are reduced to two unique resulting classes FI each associated with a distinct binary value, namely e.g. FI=0 for the class associated with normal operation, and FI=1 for the class associated with a pre-flooding.

The constructing and training phase 40 of a machine learning model M for predicting flooding further comprises a fifth step 52 of resampling RS of said two resulting classes FI associated with normal operation (FI=0) and with a pre-flooding (FI=1), respectively, of said learning model M at a predetermined sampling rate.

Indeed, such two resulting classes are unbalanced in terms of size, the size of the class associated with normal operation being much larger than that of the class associated with pre-flooding because the frequency of flooding is, e.g., eight times a month on average. For this purpose, a plurality of sampling ratios between the two resulting classes are e.g. tested during the step 52 in order to provide the best results, such as the ratio 10:1 where the class associated with normal operation has ten times as many samples as the class associated with pre-flooding, the ratio 5:1, the ratio 5:5 and the ratio 5:10. Preferentially, the ratio 5:5 or class associated with normal operation has as many samples as the class associated with pre-flooding is used according to the present invention during the re-sampling step 52.

The constructing and training phase 40 of a machine learning model M for predicting flooding further comprises a sixth step T 54 of determining, training and validating said learning model M using all the samples coming from the resampling step.

According to a particular aspect, during the step 54, the determination of the learning model is performed using a cross-validation approach by dividing in particular, all the samples from the resampling step into two disjoint subsets, one dedicated to training and the other to validating the learning model M. The subset dedicated to training is further subdivided into a predetermined number of disjoint cross-validation subsets and e.g. processed by means of a sliding window technique for time data series using in particular, previous sample steps for predicting the following sample steps by time lags.

The determination of the most efficient learning model M for predicting past flooding associated with the set of data collected beforehand, is performed according to the present invention within a list of types of predetermined models having a degree of interpretability greater than a required and predetermined interpretability threshold. Such a list e.g. comprises the following types of models: logistic regression, decision trees, random forests, artificial neural networks and support vector machines, etc.

The performance of each model in this list is measured using the AUC area under the Receiver Operating Characteristic (ROC) curve representing the performance of a classification model for all classification thresholds and plots the rate of true positives (actual flooding) depending on the rate of false positives (false flooding).

E.g., for an atmospheric distillation column e.g. at the Donges refinery in France, the best performing learning model M is a random forest model with a predetermined number of estimators and a maximum depth configured for extending each node of the random forest until all leaves are pure or until all leaves contain less than two samples.

Thus, through all the aforementioned steps 44 to 54, the constructing and training phase of a machine learning model makes it possible to determine, to train the most efficient learning model M to use for a real-time prediction of a "pre-flooding" situation, which is the originality of the present invention which predicts a "pre-flooding" phenomenon preceding the flooding by about sixty minutes, instead of an actual flooding which no longer allows an operator to take action for reversing the process and preventing flooding.

Figure 2:
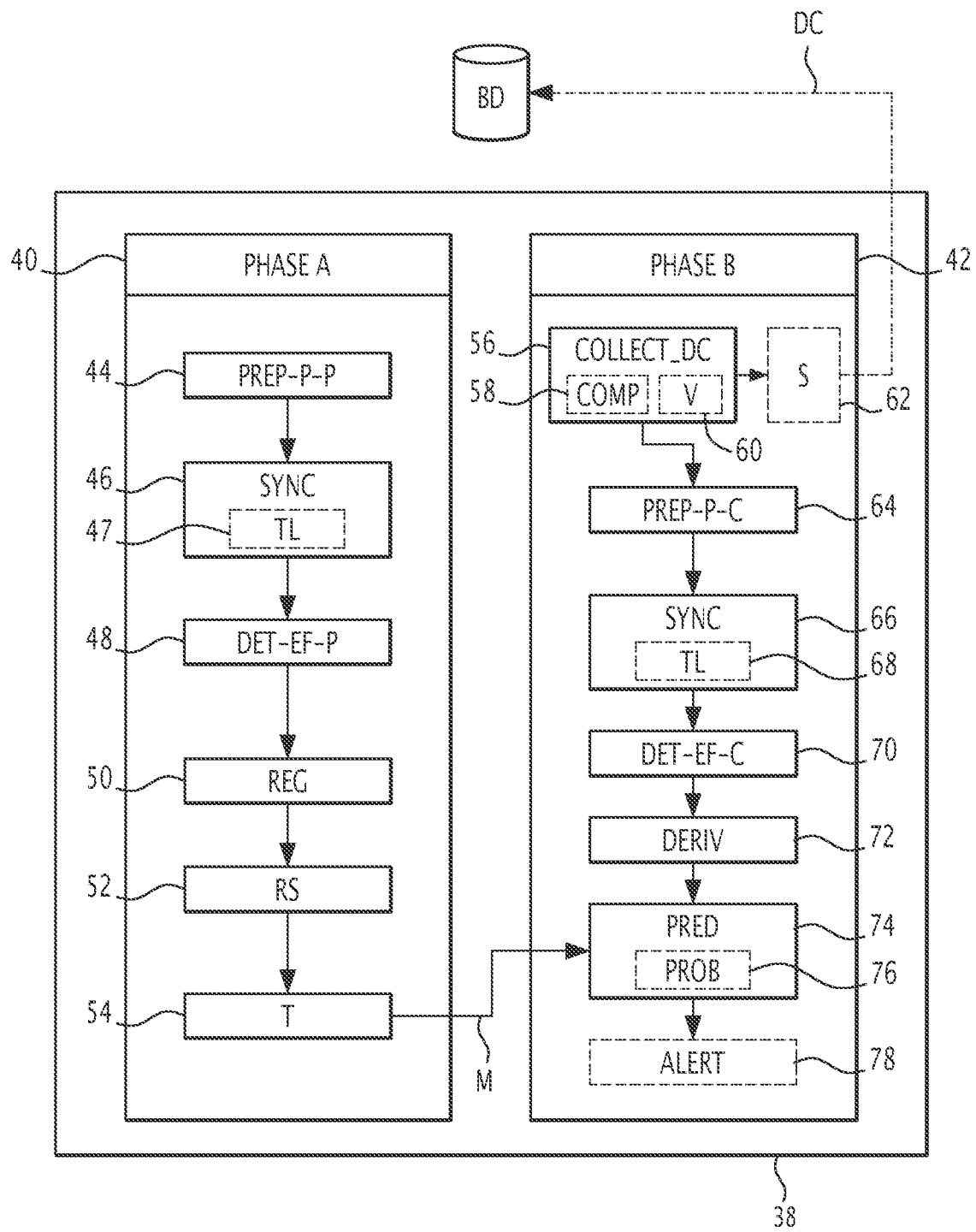
FIG. 2 is a flowchart of a prediction method according to the invention, the method being implemented by the prediction system shown in FIG. 1.

On FIG. 2, the operational phase B 42 of predicting flooding, as implemented in real-time by the flooding prediction unit 14, then comprises the following steps implemented in real-time.

According to a first step 56, the collection module 16 of the flooding prediction unit 14 collects COLLECT_DC a current data flow DC until a data buffer of predetermined size is filled, each datum of the current data flow also being associated with a sensor time datum.

In particular, according to an optional complementary aspect, such collection COLLECT_DC comprises a compression step 58 COMP with a predetermined compression ratio preferentially memorized, e.g. of one datum per minute, and a step 60 of verifying V that said compression ratio is maintained at each subsequent collection step 56. Such compression makes it possible to maintain the quality of collected data necessary for a subsequent efficient training of the learning model M.

In particular, according to another optional complementary aspect, the collection 56 is followed by a step 62 of storing S the data of the current data flow DC within the set of data previously collected within the database BD for a subsequent iteration of the constructing and training phase 40 of the machine learning model M for predicting flooding, updating said machine learning model for a subsequent iteration of said prediction operational phase 42. The constructing and training phase 40 of the machine learning model M for predicting flooding is e.g. reiterated, for updating, after a predetermined number of actual flooding events.

Then according to a step 64, the operational phase B 42 of predicting flooding, as implemented in real-time by the flooding prediction unit 14 comprises a preprocessing PREP-P-C of the data from the data buffer, by predetermined cleansing and classification delivering a current set of clean and classified data similar to what is implemented during the constructing and training phase 40 of a machine learning model M with data collected beforehand.

A synchronization step 66 SYNC also follows the preprocessing step 64 as implemented during the constructing and training phase 40 of a machine learning model M with data collected beforehand, but this time by applying such synchronization to the sensor time data associated with the data of the current collected data flow of the current set of clean and classified data, which delivers a current set of clean, classified and synchronized data.

In the same way as performed during the construction and training phase 40, such synchronization 66 comprises the application 68 of time lag(s) TL determined as a function of the position of each sensor of said set of sensors $C_1$ to $C_N$.

Then, according to a step 70, from the current set of clean, classified and synchronized data, the determination DET-EF-C of at least one current value of a variable representative of at least one current performance of said at least one distillation column is implemented, and added to the current set of clean, classified and synchronized data so as to form a current set of data to be processed.

According to a step 72, the formation of a current set of transformed data is implemented by calculating predetermined derivatives DERIV of the current set of data to be processed.

Finally, according to a step 74, the prediction of the current state of said at least one distillation column by applying said learning model M to said current set of transformed data is implemented, said current state corresponding to a binary value representative of either the presence or the absence of a current pre-flooding.

In particular, according to an optional supplementary aspect, the prediction step 74 determines a probability PROB and compares same with a predetermined probability threshold during a step 76 so as to obtain the binary value representative of either the presence or the absence of a current pre-flooding.

The operational phase B 42 of predicting flooding, as implemented in real-time by the flooding prediction unit 14 further comprises, after predicting 74 the current state of said at least one distillation column, a step 78 of generating and returning an alert ALERT to at least one operator located within the refinery R, in particular via the screen E, in the event of obtaining a binary value representative of the presence of a current pre-flooding with an associated probability value greater than the predetermined probability threshold, during the prediction step 74.

According to a practical aspect for real-time processing, as soon as a prediction is obtained, the oldest datum collected within the buffer is deleted so as to make possible the collection of a datum following the most recent datum collected within the buffer, and the steps 64 to 68 are then reiterated and so on.

In other words, during the operational 42 phase B of predicting flooding, as implemented in real-time by the flooding prediction unit 14, the data of the current data flow are processed in a similar manner to what is performed during the constructing and training phase 40 of a machine learning model M with data collected beforehand, so that the learning model M is just as efficient by using a current set of data to be processed corresponding to a current set of clean, classified, synchronized and enriched data.

It will thus be understood that the method of predicting flooding of at least one distillation column of a refinery according to the invention is used specifically for diagnosing in real-time and in advance, the risk of flooding in the distillation columns of a refinery. With such approach, it is possible to send an early alert to an operator for the distillation column(s) of a refinery since a pre-flooding of said distillation column(s) of a refinery is detected instead of a flooding as such, which enables the operator to react before the flooding occurs and is a source of leakage or at least of loss of efficiency of the distillation column, and makes it possible to reduce the downtime of the distillation column which could be subject to flooding and improves the safety of the associated distillation process Compared to U.S. Pat. No. 2018/275690 A1 which discloses in particular, that the performance of the refinery, or of a refinery unit, is compared to the performance predicted by one or more process models in order to identify differences or deficiencies in operation, the present invention proposes a solution which precedes in time, the presence of a malfunction corresponding to the flooding as such in the distillation column(s) of a refinery.

The solution according to the present invention thus makes it possible to avoid a loss of performance which, according to the document U.S. Pat. No. 2018/275690 A1, is necessary for detecting an overall malfunction of the refinery, without a precise localization of the cause of such a malfunction nor local detection of flooding in the distillation column(s) of the refinery, and even less of pre-flooding in the refinery distillation column(s).

The invention claimed is:

1. A method for predicting flooding in at least one distillation column of a refinery, as implemented by machine learning, the method comprising:
    a constructing and training phase of a machine learning model for predicting flooding, as obtained from a set of data collected beforehand, during a predetermined prior period, and at least from a set of sensors of the refinery, each collected datum being associated with a sensor time datum,
    an operational phase for predicting flooding comprising the following steps:
    from said set of sensors of the refinery, collecting a current data flow until a data buffer of predetermined size is filled, each datum of the current data flow being further associated with a sensor time datum,
    pre-processing the data from the data buffer by predetermined cleansing and classification delivering a current set of clean and classified data,
    synchronizing the sensor time data associated with the data of the current collected data flow of the current set of clean and classified data, delivering a current set of clean, classified and synchronized data,
    from the current set of clean, classified and synchronized data, determining at least one current value of a variable representative of at least one current performance of the at least one distillation column, and adding the at least one value of the variable to the current set of clean, classified and synchronized data so as to form a current set of data to be processed,
    forming a current set of transformed data by calculating predetermined derivatives of the current set of data to be processed, and
    predicting the current state of said at least one distillation column by applying said learning model to said current set of transformed data, said current state corresponding to a binary value representative of either the presence or the absence of a current pre-flooding.

2. The prediction method according to claim 1, wherein the phase of constructing and training a machine learning model for predicting flooding comprises the following steps:
    pre-processing the set of data collected beforehand by pre-determined cleansing and classification which delivers a preliminary set of clean and classified data,
    synchronizing the sensor time data associated with the collected data of the preliminary set of clean and classified data, delivering a preliminary set of clean, classified and synchronized data,
    from the preliminary set of clean, classified and synchronized data, determining at least one value of a variable representative of at least one preliminary performance of said at least one distillation column, and adding said at least one value of the variable to the preliminary set of clean, classified and synchronized data so as to form a preliminary set of data to be processed, performing regression on said learning model, by calculating and filtering predetermined derivatives of the preliminary set of data to be processed, forming two classes resulting from said learning model associated with normal operation of said at least one distillation column and with a pre-flooding of said at least one distillation column, respectively, resampling said two classes resulting from said learning model at a predetermined sampling rate, and determining, training and validating said learning model using all the samples coming from the resampling step.

3. The prediction method according to claim 2, wherein the synchronization implemented within the constructing and training phase of a machine learning model for predicting flooding and/or implemented within the flooding prediction operational phase, comprises applying time lag(s) determined as a function of the position of each sensor of said set of sensors.

4. The prediction method according to claim 1, wherein the learning model is a random forest model comprising a predetermined number of estimators, and a maximum depth configured for extending each node of the random forest until all leaves are pure or until all leaves contain less than two samples.

5. The prediction method according to claim 2, wherein the current variable representative of at least one current performance and/or the variable representative of at least one prior performance are of the type belonging to the group comprising at least:
 a variation in the gross flow-rate within the at least one distillation column,
 a flooding characteristic corresponding to the difference between a predetermined reflux flow-rate setpoint and a reflux flow-rate measured and collected during a data collection step associated with the operational phase or the construction phase,
 an upper recirculation indicator of the at least one distillation column corresponding to the ratio of the liquid-vapor ratio to the reflux ratio of the draw tray, the liquid-vapor ratio and the reflux ratio being measured and collected during a data collection step associated with the operational phase or with the construction phase,
 a risk indicator determined at least from temperature and pressure data of the at least one distillation column measured and collected during a data collection step associated with the operational phase or the construction phase,
 a flooding indicator obtained from predetermined theoretical equations and an associated binary indicator,
 a set of predetermined temperature differences and ratios obtained from at least two sensors of said set of sensors located at distinct positions with respect to the position of said at least one distillation column,
 a material balance, and
 an enthalpy.

6. The prediction method according to claim 1, wherein the prediction step associates a probability with the binary value and wherein the method further comprises, after predicting the current state of said at least one distillation column, a step of generating and returning an alert to at least one operator located within the refinery, in the event of obtaining a binary value representative of the presence of a current pre-flooding with an associated probability value greater than a predetermined probability threshold, during the prediction step.

7. The prediction method according to claim 1, further comprising the step of storing the data of the current data flow within the set of data collected beforehand for a subsequent iteration of the constructing and training phase of the machine learning model for predicting flooding, updating said machine learning model for a subsequent iteration of said prediction operational phase.

8. The prediction method according to claim 1, comprising a compression step implemented during the collection of a current data flow with a predetermined compression ratio and a step of verifying that said compression ratio is maintained at each subsequent collection step.

9. A non-transitory computer readable medium with instructions thereon that when executed by a processor cause the processor to implement the method for predicting flooding in at least one distillation column of a refinery according to claim 1.

10. A system for predicting flooding in at least one distillation column of a refinery, the system comprising:
 at least one database comprising data collected beforehand and stored within said database, during a predetermined prior period, and at least from a set of sensors of the refinery, each datum collected being associated with a sensor time datum,
 a unit for the preliminary construction and training of a machine learning model for predicting flooding comprising a non-transitory computer readable medium with instructions thereon that, when executed by a processor, cause the processor to execute software to process data from said database,
 a flooding prediction unit comprising a non-transitory computer readable medium with instructions thereon that, when executed by a processor, cause the processor to:
  manage a data buffer of a predetermined size,
  collect via a collection module, from said set of sensors, a current data flow until said data buffer is filled, each datum of the current data flow being further associated with a sensor time datum,
  pre-process via a pre-processing module, the data from the data buffer by predetermined cleansing and classification to deliver a current set of clean and classified data,
  synchronize via a synchronization module the sensor time data associated with the current data flow, delivering a current set of clean, classified, and synchronized data,
  determine via a determination module at least one current value of a variable representative of at least one current performance of said at least one distillation column, and for adding the value to the current set of clean, classified, and synchronized data,
  form via a formation module a current set of transformed data by calculating predetermined derivatives of the current set of data to be processed,
  predict via a prediction module the current state of said at least one distillation column by applying said learning model to said current set of transformed data, said current state corresponding to a binary value representative of either the presence or the absence of a current pre-flooding.

11. The flooding prediction system according to claim 10 wherein:

the collection module further comprises a non-transitory computer readable medium with instructions thereon that is located within the refinery and that, when executed by a processor, cause the processor to directly load the data buffer with collected data, the unit for the preliminary construction and training of the machine learning model, the data buffer, the pre-processing module, the synchronization module, the determination module, the formation module and the prediction module of the flooding prediction unit, are organized in cloud computing external to the refinery, the collection module is further configured to send collected data to the cloud-based components of the system, and the system further comprising a reception module, integrated with a transceiver module of the refinery, configured to receive information representative of the prediction of the current state of said at least one distillation column and to relay said information to at least one operator present within the refinery.

* * * * *